United States Patent Office 3,516,796
Patented June 23, 1970

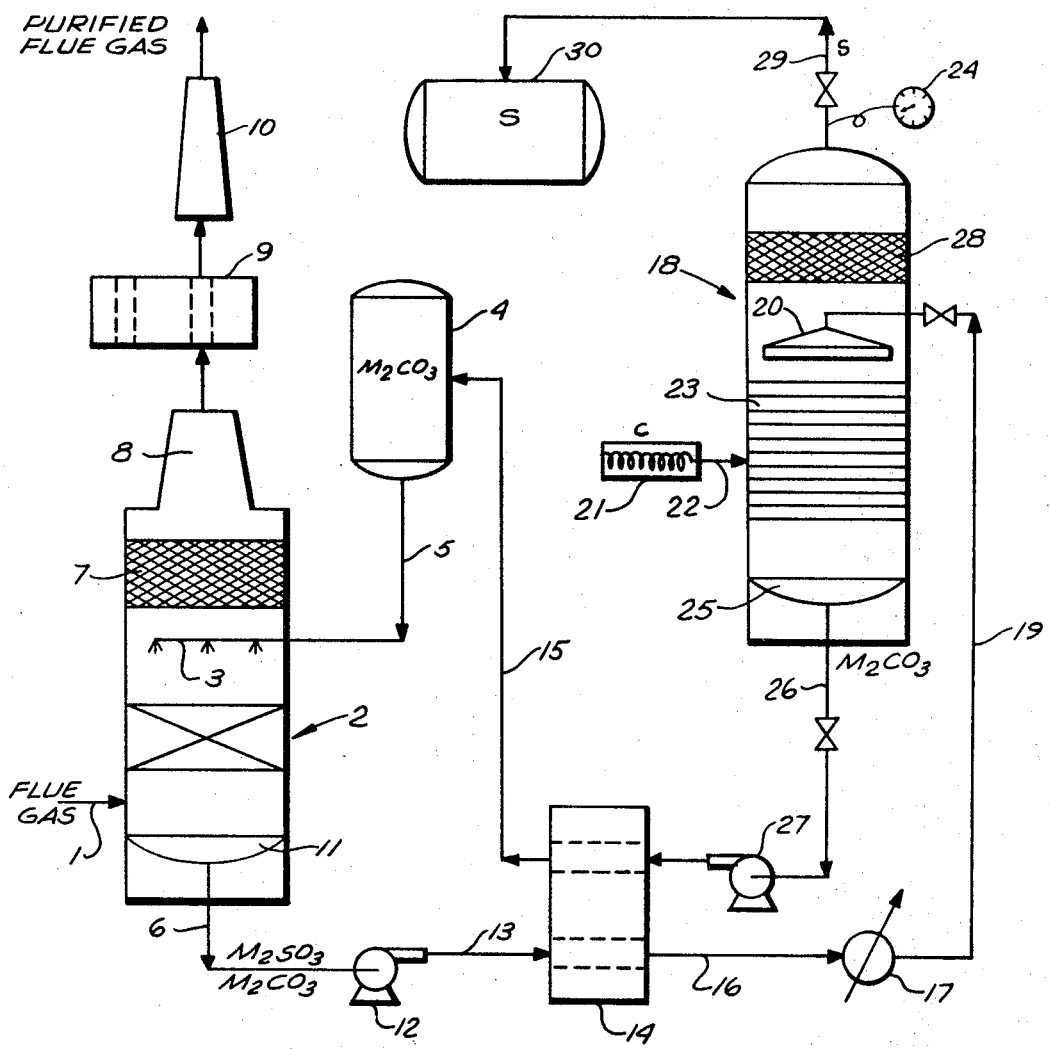

3,516,796
CARBONACEOUS PROCESS FOR
SULFUR PRODUCTION
Le Roy F. Grantham, Calabasas, and Christian M. Larsen, Reseda, Calif., assignors to North American Rockwell Corporation.
Original application May 15, 1967, Ser. No. 638,366.
Divided and this application Nov. 26, 1968, Ser. No. 779,173
Int. Cl. C01b 17/02
U.S. Cl. 23—225
5 Claims

ABSTRACT OF THE DISCLOSURE

A method for recovering sulfur from a molten salt mixture containing alkali metal sulfate or sulfite by reacting the alkali metal sulfate- or sulfite-containing molten solution with a carbonaceous material, preferably activated carbon, under reaction conditions favoring formation of sulfur and alkali metal carbonates in the molten salt.

CROSS REFERENCES TO RELATED APPLICATIONS

This is a division of application Ser. No. 638,366, filed May 15, 1967, now U.S. Pat. No. 3,438,733.

The method for removing sulfur dioxide from flue gas by absorption of the sulfur dioxide in a molten alkali metal carbonate mixture to provide a feedstock for the single-stage process of the present invention wherein the sulfur dioxide is recovered as elemental sulfur is described in U.S. Pat. No. 3,438,722.

Other processes that may also be utilized for treatment of the resultant absorbent solution provided by the process described in U.S. Pat. No. 3,438,722 are described in the following patent applications, all filed of even date herewith and assigned to the assignee of the present invention: "Two-Stage Process for Recovering Sulfur Values," Ser. No. 779,176; "Carbonaceous Process for Recovering Sulfur Values," Ser. No. 779,118; "Carbon Oxide Regenerant for Sulphur Production," Ser. No. 779,175; and "Electrochemical Process for Recovering Sulfur Values," Ser. No. 779,119.

BACKGROUND OF THE INVENTION

This invention relates to a process for the removal of sulfur compounds from molten salts and their recovery as elemental sulfur. It particularly relates to a process wherein a molten salt mixture containing alkali metal sulfate or sulfite is reacted in a single-stage process utilizing carbon, sulfur values being recovered from the molten salt directly in the form of elemental sulfur.

Sulfur oxides, principally as sulfur dioxide, are present in the waste gases discharged from many metal refining and chemical plants and in the flue gases from electric power plants. The control of air pollution resulting from this discharge of sulfur oxides into the atmosphere has become increasingly urgent. An additional incentive for the removal of sulfur oxides from waste gases is the recovery of sulfur values otherwise lost by discharging to the atmosphere. However, particularly with respect to the flue gases from power plants, which based on the combustion of an average coal may contain as much as 3000 p.p.m. sulfur dioxide and 30 p.p.m. sulfur trioxide by volume, the large volumes of these flue gases relative to the quantity of sulfur which they contain make removal of the sulfur compounds from these gases expensive. Also, while the possible by-products, such as elemental sulfur and sulfuric acid, that may be ultimately obtained from the recoverable sulfur values have virtually unlimited markets as basic raw materials, they sell for relatively low figures. Consequently, low-cost recovery processes are required. The absorption process described in U.S. Pat. 3,438,722, wherein sulfur dioxide present in flue gas is absorbed in a molten alkali metal carbonate mixture, provides one source for a molten salt composition treated by the present process.

SUMMARY OF THE INVENTION

It is an object of the present invention to provide a highly efficient method for recovering sulfur values from molten salt compositions using inexpensive, readily available materials and avoiding the use of expensive equipment. A single-stage process is provided for the direct recovery of the sulfur values as elemental sulfur without prior conversion to hydrogen sulfide gas.

In accordance with this invention, a sulfur removal process is provided comprising reacting a molten salt mixture containing alkali metal sulfates, alkali metal sulfites, or a mixture thereof at a temperature of at least 325° C. with a carbonaceous material under conditions favoring production of sulfur, so that the sulfur values are recovered as elemental sulfur directly. Such conditions include using a stoichiometric excess of alkali metal sulfate or sulfite in relation to the carbon present and maintaining formed carbon dioxide within the reaction zone under pressurized conditions.

One source of the sulfate- or sulfite-containing molten salt mixture treated by the present process is provided by the absorption process shown in U.S. 3,438,722 wherein sulfur oxides present in a hot combustion gas generally produced by burning a sulfur-containing hydrocarbon or fossil fuel are removed from the combustion gas by contacting the gas at a temperature of at least 350° C. with a molten salt mixture containing alkali metal carbonates as active absorbent to thereby remove the sulfur oxides. The melting temperature of the salt mixture is preferably between 350 and 450° C. The resultant sulfur compound that is formed consists principally of alkali metal sulfite, derived from the sulfur dioxide, and may also contain alkali metal sulfate, derived from the $SO_3$ initially present or formed by oxidation of a portion of the formed sulfite.

In copending application S.N. 779,118 a two-stage process is shown in which in a first reduction step, the resultant sulfite-containing molten absorbent solution obtained by using the process shown in U.S. 3,438,722 is treated with a carbonaceous material providing reactive carbon to convert absorbed sulfur values to alkali metal sulfide in the molten salt in accordance with the following exemplary equations:

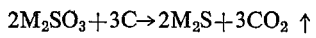
$$2M_2SO_3 + 3C \rightarrow 2M_2S + 3CO_2 \uparrow$$

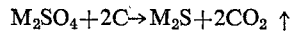
$$M_2SO_4 + 2C \rightarrow M_2S + 2CO_2 \uparrow$$

A second reformation step then follows in which the alkali metal sulfide-containing molten salt is treated with a gaseous mixture containing steam and carbon dioxide to regenerate the alkali metal carbonate and convert the alkali metal sulfide to hydrogen sulfide gas. This hydrogen sulfide gas is then used as a feedstock for conversion to sulfur or sulfuric acid.

Where sulfur is desired as the ultimate product, the present process provides in a single-stage reaction direct conversion of alkali metal sulfite to elemental sulfur together with formation of alkali metal carbonate, in accordance with the following overall exemplary equation:

$$2M_2SO_3 + 2C \rightarrow S_2 + 2M_2CO_3$$

M preferably denoting a ternary mixture of Li, Na, and K, excess $M_2CO_3$ molten salt being used as carrier solvent.

The single-stage regeneration reaction is performed at a temperature above 325° C. at which the salt is molten, suitably between 325 and 650° C. where, in addition to the alkali metal carbonate salts, other diluent salts are present which serve to lower the melting temperature of the melt. A temperature between 450 and 550° C. is preferred and is particularly desirable where only the ternary alkali metal carbonate salt is present as carrier solvent.

BRIEF DESCRIPTION OF THE DRAWING

The sole figure of the drawing shows a schematic flow diagram illustrating a preferred embodiment of the invention in conjunction with an absorption stage for the treatment of hot combustion gases obtained by the burning of a sulfur-containing fossil fuel in an electric generating plant.

DESCRIPTION OF THE PREFERRED EMBODIMENTS

The present invention is broadly directed to a single-stage process for the direct recovery of sulfur values as elemental sulfur from a molten salt mixture containing alkali metal sulfates and sulfites. The process will be particularly described in conjunction with a prior absorption stage, not a part of this invention, which may be employed to provide one source for a molten salt composition treated by the present process.

The absorption stage per se is shown in U.S. 3,438,722. In the absorption stage, sulfur oxides present in a hot combustion gas generally produced by burning a sulfur-containing hydrocarbon fuel are removed from the combustion gas by contacting the gas at a temperature of at least 350° C. with a molten salt mixture containing alkali metal carbonates as active absorbent to thereby remove the sulfur oxides. In a preferred aspect of practicing the absorption stage, the combustion gas is treated with a molten ternary salt mixture of the carbonates of lithium, sodium, and potassium, molten at 40° C., to convert the $SO_2$ present to alkali metal sulfite according to the following equation:

$$M_2CO_3 + SO_2 \rightarrow M_2SO_3 + CO_2$$

where M denotes a ternary mixture of Li, Na, and K, excess $M_2SO_3$ molten salt being used as carrier solvent. Suitably, this preferred reaction is performed at a temperature between 395 and 600° C. and particularly between 400 and 450° C., approximately corresponding to the temperature of a typical power plant flue gas.

The present invention directed to the recovery of sulfur values as elemental sulfur from certain molten salt compositions will be particularly illustrated in conjunction with the prior removal of sulfur oxides from hot combustion gases obtained by the burning of sulfur-containing fossil fuels, particularly in electric generating plants. Referring to the drawing, a flue gas obtained from the combustion of a sulfur-containing coal at a temperature of about 425±25° C. is admitted by way of a conduit 1 to an absorber unit 2. For a typical 1000-mw.(e.) coal-fired electric utility plant utilizing coal containing 3 wt. percent sulfur, about 4,650,000 cubic ft./min. flue gas with an $SO_2$ content of about 0.18 vol. percent is generated. The flue gas is passed through a fly ash precipitator (not shown) to remove fine particles entrained therein, prior to entry into the absorber. For a 1000-mw.(e.) plant, absorber unit 2 ordinarily consists of five stainless steel cyclone spray towers in parallel arrangement. These towers are suitably insulated with about 5 inches of high temperature insulation so that the temperature drop within them is less than five degrees centigrade.

The flue gas enters tangentially at the base of absorber 2 and travels upwardly with a velocity of about 20 ft./sec. It is contacted countercurrently by a spray of molten carbonate (M.P. about 400° C.) which is discharged through a spray distributor 3 located about 15 ft. above the base of the absorber tower. The molten carbonate salt is contained in a storage vessel 4, which is suitably insulated and equipped with heaters so as to maintain the carbonate salt in a molten state. The molten salt leaves vessel 4 by way of conduit 5 connected to spray distributor 3 at a flow rate adjusted to provide about 10-30 mole percent sulfite content in the effluent molten salt stream leaving the bottom of absorber 2 by way of a conduit 6.

After contacting the molten carbonate spray, the desulfurized flue gas flows past distributor 3 into a wire demister 7, which is about one foot thick and located in the upper section of the absorber tower about two feet above the distributor. The demister serves to remove entrained salt-containing droplets from the flue gas, which is then passed through a conical transition section 8 to minimize pressure drops in the absorber tower and then through a plurality of heat exchangers 9, from which it emerges at a temperature of about 150° C. Heat exchangers 9 may serve as preheaters for the water and the air used in the generating plant. The cooled flue gas from heat exchangers 9 is discharged to the atmosphere through a power plant stack 10.

The molten mixture of alkali metal carbonates in vessel 4 serves as the active absorbent. Where the melt consists essentially of only the alkali metal carbonates, a ternary mixture consisting of potassium carbonate, lithium carbonate, and sodium carbonate is utilized having a melting point between 400 and 600° C. A mixture containing approximately equal amounts by weight of the carbonates of potassium, lithium, and sodium has a melting point of about 395° C., about that of the eutectic composition. Since the low melting region around the eutectic temperature is quite broad, a relatively large variation in composition (±5 mole percent) does not change the melting point markedly. Thus, a suitable ternary eutectic composition range, in mole percent, consists of 45±5 lithium carbonate, 30±5 sodium carbonate, and 25±5 potassium carbonate.

Other nonreactive molten salts may be combined with the alkali carbonates to serve as inexpensive diluents or to lower the melting temperature of the mixture. For example, a lithium-potassium salt mixture containing chloride, sulfite, and carbonate is molten at a temperature of 325° C. Where such diluent salts are utilized, either a single alkali metal carbonate or a binary or ternary mixture of the alkali metal carbonates is combined therewith, the final mixture containing two or more alkali metal cations. In such a system as little as 2 mole percent of alkali metal carbonate may be present with the remaining 98 mole percent being an inert diluent carrier, although at least 5-10 mole percent of alkali metal carbonate is preferable. Illustrative of such a suitable mixture is one utilizing a LiCl-KCl eutectic (M.P. 358° C.) wherein the starting salt ratio consists of 64.8 mole percent LiCl and 35.2 mole percent KCl. An absorbent molten mixture containing 90 mole percent of the LiCl-KCl eutectic and 10 mole percent of a corresponding molar ratio of potassium and lithium carbonates has a melting point of about 375° C. Suitable chloride-carbonate molten salt mixtures contain, in mole percent, 15-60 K+, 40-85 Li+, and 0-20 Na+ as cations and 10-98 Cl− and 2-90 $CO_3{}^{--}$ as anions.

Although the melting points of the pure alkali metal sulfites and sulfides are considerably higher than those of the mixed alkali metal carbonates, if a sulfite or sulfide is substituted for only a portion of the carbonate the melting point is lowered, thereby making feasible the circulation of sulfite-containing carbonate melt without the need for additional heat input to keep the circulated salt molten, which would be required were sulfite obtained alone as the reaction product. An alkali metal sulfite content of 10–30 mole percent of the molten salt is preferred.

The molten sulfite-containing carbonate resulting from the rapid reaction between the molten carbonate spray and the flue gas is collected in a dished-bottom heated sump 11 of absorber 2. About a 70 mole percent excess of unreacted carbonate is maintained to serve as a solvent for the sulfite formed by the reaction. The sulfite-carbonate mixture is pumped from pump 11 of absorber 2 through conduit 6 by way of pump 12, then through a conduit 13 to a heat exchanger 14. The sulfite-carbonate mixture entering heat exchanger 14 is at a temperature of about 425±25° C. Its temperature is increased in the heat exchanger, and at the same time the temperature of regenerated molten carbonate being returned to storage vessel 4 by way of a conduit 15 is lowered. The mixture leaves heat exchanger 14 by way of a conduit 16 and passes through a heater 17, which is optionally utilized for further increasing the temperature of the mixture, where required, to about 500±25° C. For certain feedstocks, the reaction temperature used in the regenerator unit may be the same as that of the molten alkali metal sulfite-containing melt leaving absorber unit 2, thereby eliminating any need for heat exchanger 14 or auxiliary heater 17. The sulfite-carbonate mixture enters a regenerator unit 18, which is suitably pressurized, by way of a valved conduit 19 where it is fed into a trickle distributor 20. While other liquid-solid contact techniques may be used, it is generally preferred to trickle the molten liquid over the solid carbonaceous bed in order to obtain optimum contact conditions for the regeneration reaction.

The overall chemical reaction in the single-stage regenererator unit 18 involves concurrent reduction of the alkali metal sulfite to elemental sulfur and regeneration of alkali metal carbonate by treatment of the alkali metal sulfite-carbonate melt with a carbonaceous material effectively providing reactive carbon, preferably in solid or liquid form so as to provide maximum contact, and preferably in the form of activated carbon because of its fine porosity and high surface area. The term "carbonaceous material" includes hydrocarbons which decompose or dissociate to provide the desired reactive carbon. However, carbonaceous materials that produce excess amounts of reaction products that may interfere with the principal reaction should generally be avoided. By the term reactive carbon, reference is made to carbon in an available form for the regeneration reaction. Activated carbon in the form of hard granules or pellets is particularly preferred, as is elemental carbon in the form of coke, charcoal, or carbon black. However, from the point of view of process economics, waste carbonaceous materials ordinarily heavily contaminated with sulfur-containing materials, as obtained from petroleum-and coal-refining processes, are suitable as carbon feedstocks for use in the practice of the present invention. To provide a more rapid initial reaction, a source of active carbon is initially utilized, other sources of carbon such as petroleum coke, asphalts, tars, pitches, or the like, then being used subsequently.

Referring to the drawing, a source of carbon 21 is used to provide a carbonaceous material by way of a screw feed 22 to a supported bed 23 in regenerator unit 18. The molten sulfite-carbonate mixture trickling from distributor 20 reacts with the carbon in bed 23 at a temperature of 500±25° C., the sulfite generally being present in stoichiometric excess to minimize formation of alkali metal sulfide, the following overall reaction occuring:

$$2M_2SO_3 + 2C \rightarrow S_2 + 2M_2CO_3$$

alkali metal sulfide may be formed by the following reactions:

$$2M_2SO_3 + 3C \rightarrow 2M_2S + 3CO_2\uparrow$$

removal of evolved carbon dioxide promoting the reaction. The formation of alkali metal sulfide can be eliminated or minimized in the present process by maintaining the sulfite in excess and by maintaining the carbon dioxide within the vessel under pressurized conditions so that reaction occurs between any intermediately formed alkali metal sulfide and $CO_2$ according to the following reaction:

$$2M_2S + 3CO_2 \rightarrow S_2 + 2M_2CO_3 + C$$

The formation of $CO_2$ can be monitored by observing the gas pressure by means of a pressure gage 24. By preventing evolution of formed carbon dioxide from the reaction vessel, it can be made to react with any alkali sulfide present in accordance with the foregoing equation.

Alkali metal polysulfide, which is thermally decomposable to yield sulfur, may be formed as an intermediate product in the regenerator by reaction of formed sulfur with intermediately formed alkali metal sulfide. However, continued reaction of sulfide and polysulfide with $CO_2$ will serve to decompose any formed polysulfide and favor formation of alkali metal carbonate and elemental sulfur.

From both a thermodynamic and kinetic standpoint, the rate of the overall reaction is increased by increased temperature and carbon dioxide pressure. For most applications, a temperature range between 325 and 650° C. at which the sulfite-containing salt is molten is suitable, a temperature between 450 and 550° C. being preferred. Where only sulfite and carbonate is present in the melt, a temperature range of 395–650° C. is suitable, a range of 450–550° C. being preferred. With other salt diluents present that lower the melting point, a temperature range of 325–650° C. is suitable, a range of 450–550° C. also being preferred.

Upon substantial completion of the reaction between the molte nsulfide-carbonate mixture and the carbon, molten alkali metal carbonate, including both regenerated and carrier carbonate, is collected in a sump 25 at the base of regenerator 18, from where it is fed by way of a valved conduit 26 by means of a pump 27 to heat exchanger 14, where it loses heat, and then is returned to storage vessel 4 by way of conduit 15. The reconverted carbonate is then recycled to absorber 2 by way of conduit 5.

The sulfur-rich gas mixture produced in the regeneration reaction also may contain minor amounts of COS, $H_2O$, and $CO_2$. This gaseous mixture passes through a demister 28, which removes entrained liquid particles, and leaves regenerator 18 by way of a valved conduit 29 where it is fed to a sulfur storage tank 30.

The following examples illustrate the practice of the invention but are not intended to unduly limits its generally broad scope.

EXAMPLE 1

$SO_2$ absorption from flue gas

In one series of runs the feed gas consisted of $CO_2$ containing 0.1–20 vol. percent $SO_2$. The molten carbonate melt consisted of a ternary mixture of the carbonates of lithium, sodium, and potassium of approximately eutectic composition and was maintained at a temperature of about 500° C. The flow of $SO_2$ through the melt was varied from 1.5 to 24 cc./min. The inlet gas was preheated to about 400° C. before contacting the melt.

The final concentration of resultant alkali metal sulfite and molten carbonate varied from about 10 to 19.1 mole percent sulfite for feed gases having an initial concentration ranging from 1 to 18.2 vol percent $SO_2$. Material balance analyses based on wet chemical analysis and gas chromatographic analysis together with continuous monitoring of the off flue gas showed that more than 99.9% of the $SO_2$ content was removed from the simulated flue gas. The foregoing example substantially is that described in U.S. Pat. 3,438,722.

EXAMPLE 2

Reduction of alkali metal sulfite using carbon

Two runs were made in pressure vessels using appropriate amounts of lithium carbonate, potassium carbonate, and sodium sulfite to form the molten carbonate eutectic upon complete regeneration. In one run a coconut shell charcoal was used, a green petroleum coke being used in a second run. The pressure bombs were evacuated and inserted in a rocking furnace, and the rate of pressure build-up with time was followed. The reactions were carried out at 500° C., being observed to commence near 400° C., and were very rapid, maximum pressure being obtained in less than one hour without rocking. While the maximum attained pressure was 60–80 p.s.i.g., the pressure began to decrease after less than an hour of reaction, indicating reaction by intermediately formed $CO_2$ gas.

Both gas samples and the melt composition were analyzed. Gas chromatographic analysis confirmed that the evolved gas was $CO_2$. Analysis of the melt at various distances from the carbon-molten salt interface showed that several competing reactions occurred. At the carbon-melt interface itself, only molten alkali carbonate was present indicating full regeneration based on reaction of carbon dioxide with the sulfide in the melt. A total sulfur analysis of the melt made at the bottom of the bomb indicated that while 14.5 wt. percent of the sample was sulfur, no sulfite was present and only 4.8% of the sulfur was present as sulfide or sulfate, the remainder of the sulfur concentrating in the bottom of the bomb in the form of sulfur and polysulfide. Both runs showed essentially similar results.

EXAMPLE 3

Flow reduction of alkali metal sulfite using carbon

The reaction vessel used consisted of a stainless steel bomb constructed in such a manner that an inlet gas could be bubbled through the melt contained therein where so desired. A stainless steel screen spot-welded to the reaction vessel walls was used for supporting the bed of carbon used. Provision was also made for taking a molten salt sample periodically for analysis as well as for monitoring the off-gas. The bomb contained coconut shell charcoal that had been activated with high pressure steam and was 6–14 mesh size and had a maximum ash content of 5%. The mixture of alkali metal carbonates ($M_2CO_3$ where M=K, Li, Na) corresponded to the ternary eutectic composition. This mixture was premelted and ground prior to insertion in the bomb. The bomb was inverted initially and $SO_2$ gas was bubbled in to charge the carbonate melt with sulfite. During the charging, neither the melt nor the $SO_2$ gas contacted the charcoal.

The starting material was 100% alkali metal carbonate eutectic containing 60 wt. percent carbonate ion; during the $SO_2$ absorption step the carbonate content decreased to 73% $M_2CO_3$ or 44.2 wt. percent carbonate ion. Off-gas analysis during the $SO_2$ pickup step indicated over 99.9% absorption, no $SO_2$ being present in the off-gas. After addition of the $SO_2$, the bomb was inverted so that the sulfite-containing melt was in contact with the charcoal. The regeneration run was made over a period of several days, the temperature used being between 450 and 700° C. Analyses of the melt made during the course of the regeneration step revealed the presence of sulfate as well as sulfite. Final analysis of the regenerated melt showed that alkali metal carbonate had been fully regenerated (59.4 wt. percent carbonate ion) and that all the sulfite originally present in the melt as well as sulfate formed during regeneration, had been converted. No alkali metal sulfite or sulfate was detected. Because of excess charcoal present, the sulfur was present in the form of an adsorbed polysulfide on the charcoal, produced by reaction of alkali metal sulfide with formed sulfur.

In copending applications S.N. 779,172, S.N. 779,176 and S.N. 779,118, $H_2S$ is formed as the final product containing the sulfur values. For conversion to elemental sulfur, this $H_2S$ feedstock requires treatment in a Claus reactor. The present process is particularly advantageous where sulfur is desired as the final product, it being evolved directly from the regenerator without necessity for proceeding through a Claus reactor. Further, the direct production of sulfur by a single-stage process, compared with a two-stage process is generally advantageous where comparable yields are obtainable.

It will, of course, be realized that many variations in reaction conditions can be used in the practice of this invention, depending in part upon the particular sulfur oxide content of the flue gas to be desulfurized, as well as the hydrocarbon or fossil fuel serving as the source of combustion gas. The term "hydrocarbon or fossil fuel" broadly includes carbonaceous fuels, such as coal, oil-shale, petroleum products, natural gas, and associated waste products, such as acid sludges and tars.

Thus, while certain exemplary reactions have been described for the absorption and regeneration stages, it has been found, particularly with respect to the regeneration stage, that the actual mechanism of reaction is a highly complex one and several competing reactions may occur simultaneously. Therefore, to optimize each of the absorption and regeneration stages, varying reaction temperatures and pressures may be employed. Also, there may be employed a batch process or a continuous process, perferably the latter, with the usual provision for recycle of various unreacted or partially reacted components.

Further, even where the desired reactions do not go to completion and products are also present produced by competing or undesired side reactions, the unreacted or undesired products may be recycled in the process without substantial interference with the basic absorption and regeneration stages. Thus, while the examples illustrating this invention have been described with respect to specific concentrations, times, temperatures, and other reactions, the invention may be otherwise practiced, as will be readily apparent to those skilled in this art. Accordingly, this invention is not to be limited by the illustrative and specific embodiments thereof, but its scope should be determined in accordance with the claims thereof.

We claim:

1. The process for recovering sulfur values which comprises reacting a molten salt composition containing as reactive component alkali metal sulfates, alkali metal sulfites, or a mixture thereof, at a temperature of at least 325° C. with a carbonaceous material providing a source of reactive carbon under conditions favoring production of sulfur, which include using a stoichiometric excess of the reactive alkali metal salt component in relation to the carbon present and maintaining formed carbon dioxide within the reaction zone under pressurized conditions, to thereby form alkali metal carbonates in said molten salt and elemental sulfur as a recoverable product.

2. The process for recovering sulfur values which comprises reacting a molten salt composition containing as reactive component alkali metal sulfites at a temperature of at least 325° C. with a carbonaceous material providing a source of reactive carbon under conditions favoring production of sulfur, which include using a stoichiometric excess of alkali metal sulfites to the carbon present and maintaining formed carbon dioxide within the reaction zone under pressurized conditions, to thereby form alkali metal carbonates in said molten salt and elemental sulfur as a recoverable product.

3. The process according to claim 2 wherein the reaction temperature is maintained at a temperature between 325 and 650° C. at which the salt containing alkali metal sulfites is molten.

4. The process according to claim 2 wherein the reaction temperature is maintained between 450 and 550° C.

5. The process according to claim 2 wherein the source of reactive carbon is selected from the class consisting of carbon black, charcoal, and coke.

References Cited

UNITED STATES PATENTS

| | | | |
|---|---|---|---|
| 1,640,314 | 8/1927 | Freeman | 23—137 |
| 3,111,377 | 11/1963 | Mugg | 23—63 |
| 3,127,237 | 3/1964 | Markant | 23—63 |
| 3,133,789 | 5/1964 | Guerri | 23—63 X |
| 3,148,950 | 9/1964 | Mugg | 23—224 |

OSCAR R. VERTIZ, Primary Examiner

G. O. PETERS, Assistant Examiner

Disclaimer 3,516,796.—*Le Roy F. Grantham*, Calabasas, and *Christian M. Larsen*, Reseda, Calif. CARBONACEOUS PROCESS FOR SULFUR PRODUCTION. Patent dated June 23, 1970. Disclaimer filed Mar. 19, 1970, by the assignee, *North American Rockwell Corporation*.

Hereby disclaims the terminal portion of the term of the patent subsequent to Apr. 15, 1986.

[*Official Gazette September 8, 1970.*]

PO-1050
(5/69)

UNITED STATES PATENT OFFICE
CERTIFICATE OF CORRECTION

Patent No. 3,516,796     Dated June 23, 1971

Inventor(s)  LeRoy F. Grantham and Christian M. Larsen

It is certified that error appears in the above-identified patent and that said Letters Patent are hereby corrected as shown below:

Column 3, line 49, "40°" should read --400°--

Column 10, under References Cited, line 6, "Guerri" should read -- Guerrieri--

Signed and sealed this 21st day of March 1972.

(SEAL)
Attest:

EDWARD M. FLETCHER, JR.
Attesting Officer

ROBERT GOTTSCHALK
Commissioner of Patents